T. A. EDISON.
PHONOGRAPH OR TALKING MACHINE.
APPLICATION FILED AUG. 12, 1912.

1,184,334.

Patented May 23, 1916.
5 SHEETS—SHEET 2.

Witnesses:
Frank D. Lewis
Frederick Bachmann

Inventor:
Thomas A. Edison
by Frank L. Dyer
his Atty.

UNITED STATES PATENT OFFICE.

THOMAS A. EDISON, OF LLEWELLYN PARK, WEST ORANGE, NEW JERSEY.

PHONOGRAPH OR TALKING-MACHINE.

1,184,334.  Specification of Letters Patent.  Patented May 23, 1916.

Application filed August 12, 1912. Serial No. 714,561.

*To all whom it may concern:*

Be it known that I, THOMAS A. EDISON, a citizen of the United States, and a resident of Llewellyn Park, West Orange, Essex county, New Jersey, have invented certain new and useful Improvements in Phonographs or Talking-Machines, of which the following is a description.

My invention relates to phonographs or talking machines, particularly of the type in which disk or flat records are operated upon and preferably in which the sound conveying and amplifying horn is inclosed within a suitable cabinet, my present invention resembling in some respects that disclosed in my application Serial No. 609,100, filed February 17, 1911.

The principal object of my invention is to provide a machine of the type above referred to, which may be constructed in a compact and inexpensive form.

Another object of my invention is to provide means for rotating the record support and feeding the reproducer across the record surface, and means whereby the said first named means are rendered inoperative when the reproducer is disengaged from the record surface.

A further object of my invention is to provide a metallic talking machine cabinet adapted to support the talking machine motor and of such a construction that the vibrations of the motor will not be imparted to the cabinet, unpleasant foreign sounds, such as would be produced by the vibration of the cabinet being thereby avoided.

Other objects of my invention will appear more fully in the following specification and appended claims.

In order that my invention may be more fully understood, attention is hereby directed to the accompanying drawings forming a part of this specification and in which:

Fig. 2ᴬ represents a sectional view illustrating a modification of the feature of my invention disclosed in Fig. 2.

In all of the views, like parts are designated by the same reference numerals.

Referring to the drawings, the sound reproducer 1 carries stylus 2 adapted to reproduce a record 3 carried by the rotatable turntable or record support 4 which is mounted on the top of the cabinet 5. The reproducer shown is of the type described in my U. S. Patent No. 1,055,621, in which the stylus is carried by a lever pivotally mounted on a floating weight, this construction providing sufficient freedom of movement of the stylus to permit the latter to accommodate itself to surface irregularities in the record. The mounting for the turntable comprises a bracket 6 mounted upon the lower side of the top of the cabinet and rotatably supporting the spindle 7 passing through the bushing 8 in the top of the cabinet and secured at its upper end to the turntable 4. The reproducer is carried by the arm 9 of the sound conveyer, which arm extends rearwardly from the reproducer, thence downwardly through an opening in the top of the cabinet, as shown at 10, and thence forwardly, as shown at 11, the forwardly directed portion of the sound conveyer terminating in a forwardly directed amplifying exit portion 12. The opening in the top of the cabinet, as shown, is materially larger than the cross section of the sound conveyer at the point where the latter passes through the said opening. The sound conveyer is preferably formed continuous, or without flexible joint, and the taper thereof increases from the small end to the exit thereof; so that a very pure and efficient amplification of the sound waves from the reproducer is obtained.

The conveyer is pivotally supported by a rod 13 extending through the portion 10 of the sound conveyer and preferably secured thereto as by solder, the rod 13 extending rotatably and slidably through an opening 14 in a bracket 15 mounted upon the top of the talking machine cabinet and through vertically alined openings in lugs or projections 16 upon the bracket 17 secured within the talking machine cabinet to the rear wall thereof. The upper end of the rod 13 is provided with an enlargement 18 engaging the top of the horizontal projection 19 on the bracket 15 to limit the downward movement of the rod 13 and the sound conveyer. To facilitate the raising and lowering of the rod 13 and the sound conveyer and reproducer, I provide a cam 20 pivoted to the enlargement 18, this cam having secured thereto a knurled head 21 by which it may be readily rotated.

Figure 6:
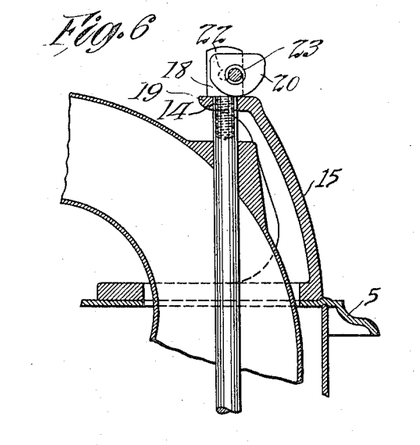
Fig. 6 represents a vertical sectional view on the line 6—6 of Fig. 7 and illustrating the upper part of the mounting of the sound conveyer.
Figure 7:
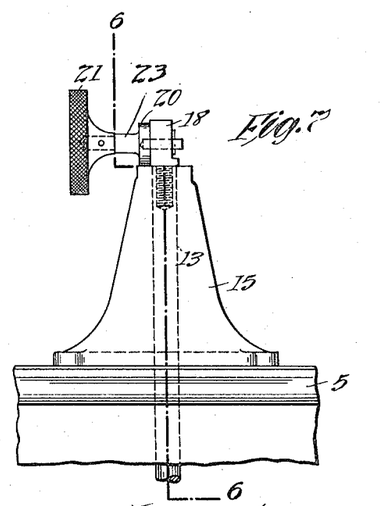
Fig. 7 represents an elevation of the parts shown in Fig. 6 taken from a point to the right of Fig. 6.

Referring particularly to Fig. 6, it will be noted that the axis of the pivot 22 by which the cam 20 is connected to the enlargement 18 is located a substantial distance to the left of the axis of the stem 23 whereby the knurled head 21 is connected to the cam 20. By reason of this construction, the upward movement of the sound conveyer upon the rotation of the knurled head 21 is equal to the sum of the upward movement caused by the cam action of the member 20 upon the bracket arm 14 and that caused by the eccentricity of the axis of the member 22 with respect to the axis of the member 23, so that a considerable vertical movement of the conveyer is obtained.

Figure 8:
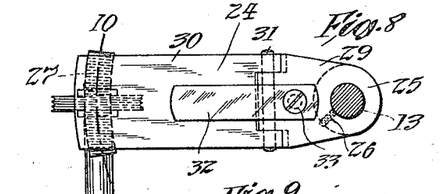
Figs. 8 and 9 represent a plan view and side elevation respectively of details of the apparatus employed for feeding the sound conveyer laterally.
Figure 9:
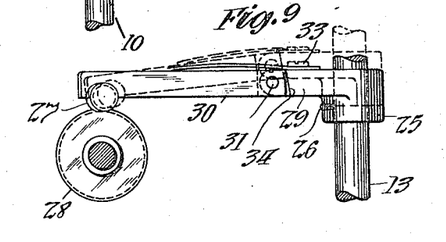
Figure 10:
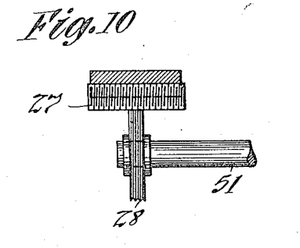
Fig. 10 represents a sectional view taken on the line 10—10 of Fig. 8.
Figure 11:
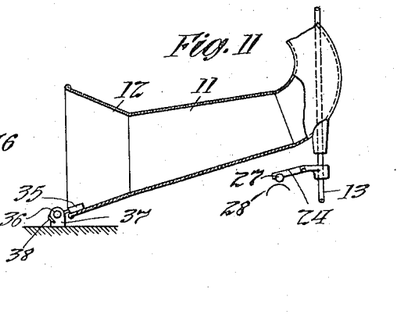
Figs. 11 to 17 inclusive represent views of details of construction, Fig. 12 being in elevation, Fig. 13 in central cross section, and Figs. 11, 14, 15, 16 and 17 being partly in section and partly in elevation, the section shown in Fig. 17 being taken on the line 17—17 of Fig. 16.
Figure 12:
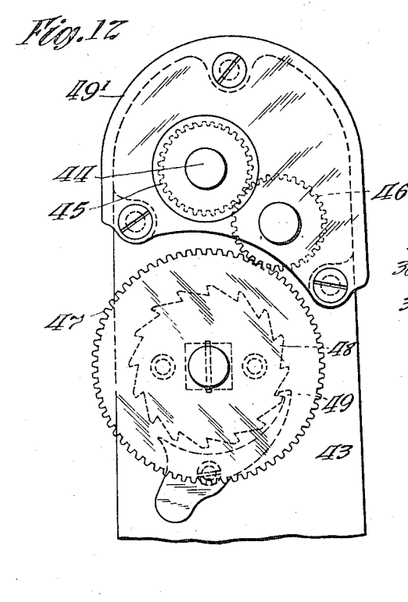

For moving the sound conveyer laterally and feeding the reproducer across the record surface, I provide a rack or sector 24 having a hub-like portion 25 (see Figs. 8 and 9) whereby it is secured to the rod 13, as by a screw 26, and having also a toothed portion 27 adapted to engage with a gear 28 driven from the talking machine motor, as will hereinafter be explained. The rack or sector is preferably formed of two sections, one section 29 secured to the rod 13 and a second section 30 connected to the section 29 by a pivot 31, the axis of which pivot extends substantially parallel to the central axis of the gear 28. A spring 32 secured to the section 29, as by the screw 33, bears upon the section 30 to press the same downwardly and to normally hold the same in engagement with the gear 28, a shoulder 34 on the section 29 serving by its engagement with the pivoted end of the section 30 to limit the downward movement of the latter. For a reason which will appear more fully hereinafter, the teeth on the member 27 are curved transversely to the length thereof and to the axis of the member 28, the member 27 being preferably a worm soldered into a recess in the section 30. As the rack or sector oscillates about the axis of the rod 13, the axis of the worm 27 should be curved on an arc of a circle about the axis of the rod 13 as a center, as shown. In order to resist undesired lateral oscillation of the conveyer and reproducer whenever the member 27 is disengaged from the driving gear 28, means, such as the friction shoe 35 (see Figs. 3, 4, and 11) bearing slidably on the inner surface of the exit end of the sound conveyer, is provided, such means yielding sufficiently to permit the manual oscillation of the sound conveyer about the axis of the rod 13. The friction shoe 35, which may be a short section of rubber tubing, is mounted on the end of a right angular rod 36, the side of the said rod opposite that carrying the shoe 35 being pivotally mounted in a bearing 37 mounted in the bottom of the phonograph cabinet. A spring 38 serves to rotate the rod 36 to press the shoe into engagement with the sound conveyer, the downward movement of the shoe 35 being limited by a screw 39 (see Fig. 3) threaded into the bracket 37 and engaging the under side of the rod 36.

In the operation of the invention, the record 3 is placed upon the record support when the sound conveyer and the reproducer carried thereby are in elevated position. In this position of the sound conveyer and reproducer, the friction shoe 35 is in engagement with the sound conveyer and resists accidental lateral movement thereof, but the resistance of the shoe 35 is not sufficient to prevent lateral movement of the sound conveyer and adjustment of the reproducer to its proper position above the record by the application of a slight pressure. The reproducer having been brought to proper position over the record groove, the knurled head 21 is rotated to permit the sound conveyer and reproducer to lower so as to bring the stylus 2 in operative engagement with the record surface and to engage the member 27 with the gear 28, downward movement of the conveyer being limited by the engagement of the enlargement 18 with the arm 19 of the bracket 15. The driving means for the gear 28 and for the record support having been set into operation, the gear 28 drives the rack 24 through the member 27 to cause the conveyer to swing laterally and the reproducer to move across the record surface, the gear teeth 27 being effectively held in engagement with the gear 28 by the spring 32. When it is desired to disengage the feeding means and lift the reproducer from the record surface, the rod 13 together with the sound conveyer and reproducer carried thereby are raised by the rotation of the knurled head 21. During the upward movement of the rod 13, the teeth of the feeding rack 24 will, by reason of the pivotal mounting of the portion 30 of the rack, remain in operative engagement with the teeth on the gear 27 for a substantial period and preferably until the moment when the sound conveyer has been raised sufficiently to bring the friction shoe 35 into engagement with the sound conveyer. By this construction it will be seen that even during the raising and lowering of the sound conveyer and reproducer, these parts are effectively held against accidental lateral movement. It will be noted that during the raising and lowering of the feeding rack, section 30 of the rack occupies different angular positions with respect to the plane tangent to the periphery of the gear 28 at the point of contact between the said gear and the member 27. For this reason and in order that the said gear and teeth may remain in effective operating engagement with each other, said teeth are curved transversely to the axis of the gear 28, into a convex shape, the most satisfactory construction, as hereinbefore indicated, being obtained by the mounting of a worm 27 in the section 30 of the rack.

Figure 3:
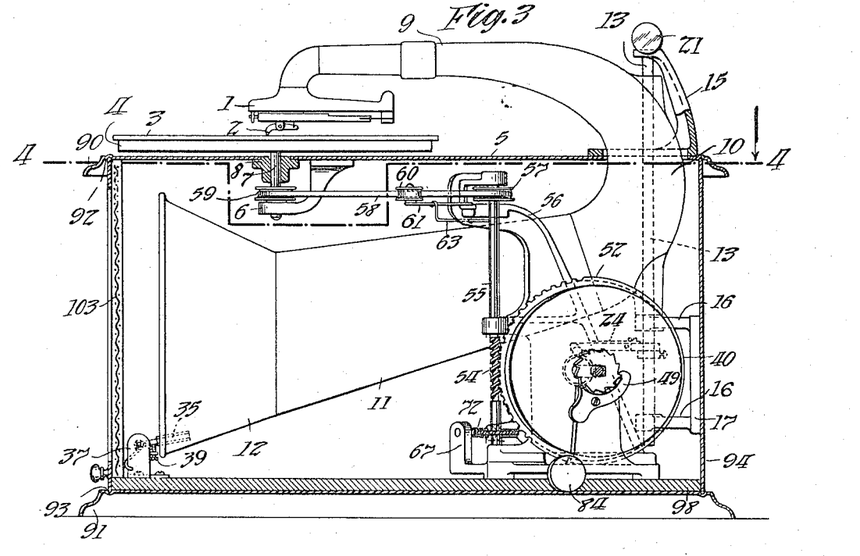
Fig. 3 represents a view of the phonograph or talking machine of Fig. 1, partly in elevation and partly in vertical section taken on the line 3—3 of Fig. 4.
Figure 4:
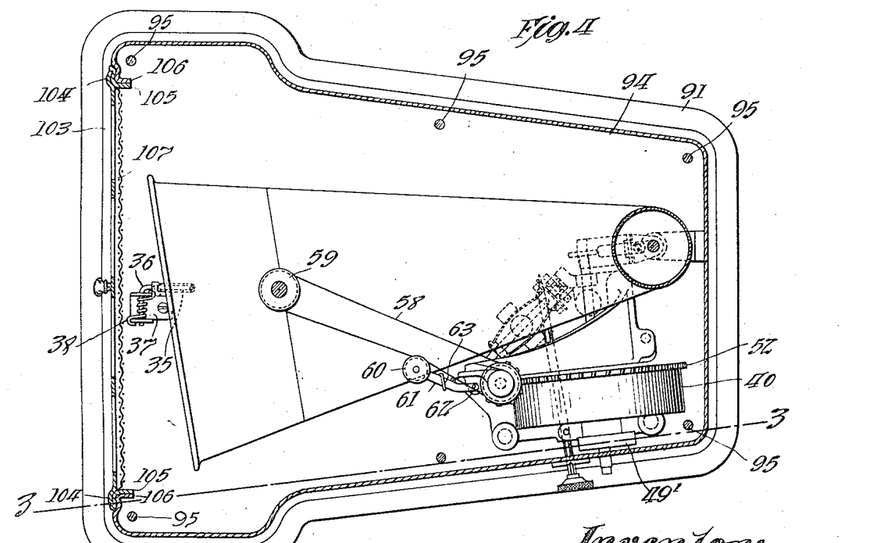
Fig. 4 represents a sectional view thereof taken on the line 4—4 of Fig. 3.
Figure 5:
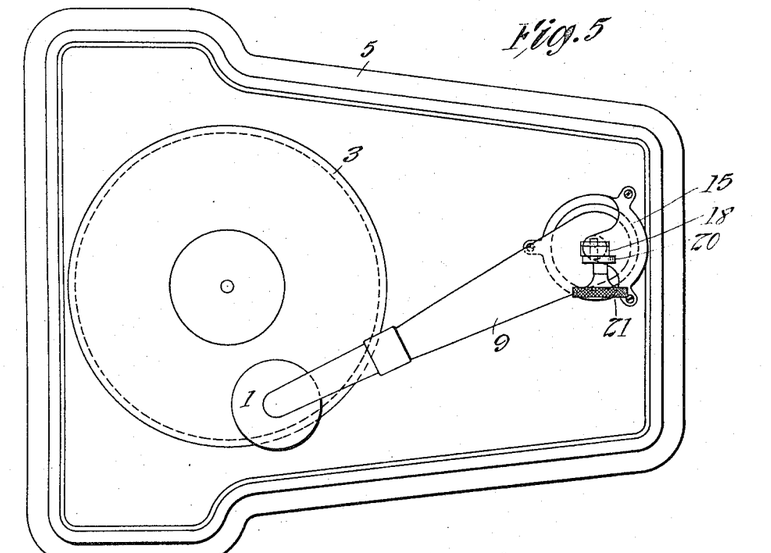
Fig. 5 represents a top plan view thereof.
Figure 13:
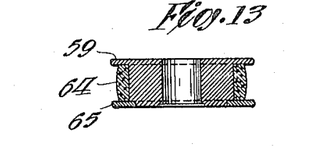
Figures 14, 15:
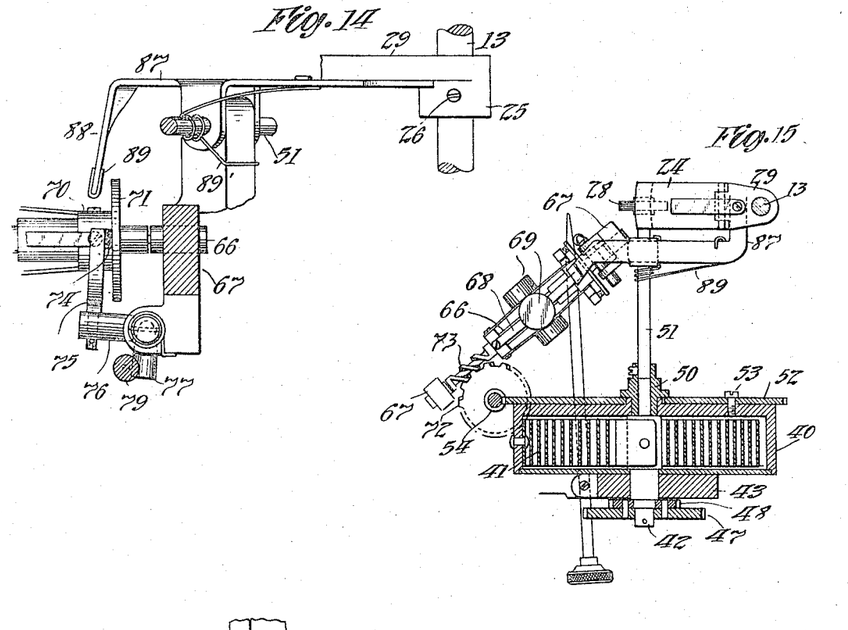
Figure 16:
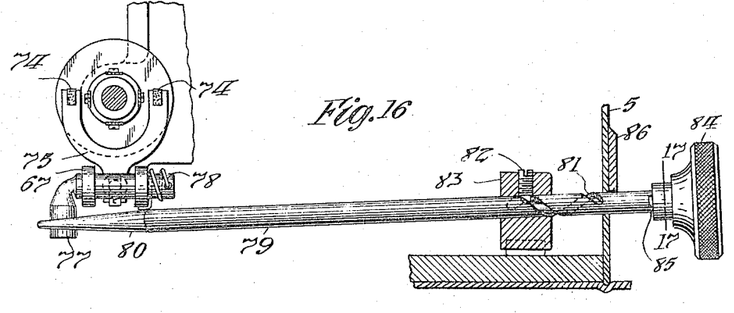

Referring to Figs. 3, 4, and 15, the means for rotating the record support and driving the feeding means hereinbefore referred to comprises a motor having the usual rotatable spring barrel 40, to the periphery of which is secured one end of the spring 41, (see Fig. 15), the other end of which is secured to the arbor 42 passing rotatably through the spring barrel and serving as a means for mounting the same upon the bracket 43. The rewinding mechanism for the motor is of common construction and comprises a stud 44 adapted to be engaged by the usual rewinding crank to rotate the gear train 45, 46 and 47. The gear 47 together with the ratchet wheel 48 coaxial therewith are non-rotatably mounted on the arbor 42, a weighted pawl 49 (see Fig. 12) being provided to engage the teeth of the ratchet wheel 48. This pawl permits rotation of the arbor 42 in the direction necessary to put the spring 41 under tension, but prevents rotation of said arbor in the opposite direction. A casing 49' covers the rewinding gear train. Passing through a bushing 50 secured to the spring barrel 40 is a shaft 51 to which the gear 28 hereinbefore referred to is secured and from which the said gear is driven to operate the rack 24 and produce the desired feeding movement of the sound conveyer and reproducer. On the inner face of the spring barrel 40, a spiral gear 52 of slightly greater diameter than the spring barrel is secured, as by screws 53, the gear 52 meshing with and serving to rotate a spiral gear 54 on the vertical spindle 55 (see Fig. 3) rotatably mounted in lugs on the bracket 56 forming a part of the motor frame. On the upper end of the spindle 55 is secured a pulley 57, a belt 58 being engaged over the pulley 57 and the pulley 59 secured to the spindle 7 on the record support. A pulley 60 mounted on a support 61, pivoted as shown at 62 (see Fig. 4), is pressed against the belt 58 to hold the same taut by a spring 63 engaging the arm 61. In order to increase the friction between the belt 58 and the pulley 59, and at the same time to assist in the insulation of the said pulley and the record support from the vibrations of the motor, the pulley 59 is provided with an annular peripheral portion 64 of cork or similar material. The body portion of the pulley 59 is formed (as shown in Fig. 13) with but one flange, a second flange 65, being secured to the same as by peaning or soldering after the cork 64 is in position. With the above construction, the belt 58, which may be made of leather or other suitable material, serves as does the cork periphery 64 of the pulley 59 to prevent the transmission of vibrations from the motor to the record support, whereby a very true and accurate reproduction is obtainable.

The governor for the motor comprises the usual rotatable spindle 66 mounted in bearings 67 in the motor frame (see Fig. 15). To this spindle the usual governor springs 68 carrying governor weights 69 are secured at one end, the opposite ends of the springs being secured to a collar 70 (see Fig. 14) carrying a friction disk 71 which is longitudinally movable upon the spindle 66 during variations in speed of the governor. The spindle 66 is rotated by spiral gears 72 and 73, the former being rigidly mounted on the spindle 55 and the latter being formed on the spindle 66. The friction pads 74 for the governor are mounted in a frame 75 swiveled in the arm 76 of a right angular lever pivoted intermediate its end in the motor frame, as shown in Fig. 14, the other arm of this lever being shown at 77. The mounting of the friction pads 74 in the swiveled frame is disclosed in my Patent No. 604,740, granted May 31, 1898, and forms no part of the present invention. A spring 78 connected with the lever supporting the swiveled frame 75 and engaging the motor frame tends to rotate the said lever about its axis to hold the friction pads 74 in engagement with the disk 71. For adjusting the position of the friction pads with respect to the disk 71 to secure the desired speed for the motor, I provide an elongated member 79 having a conical or tapered end 80 engaging the arm 77 of the lever supporting the swiveled frame 75, this elongated member 79 being formed with a spiral groove 81, in which engages a stud 82 mounted in a support 83 secured in any suitable way to the bottom of the talking machine cabinet.

The outer end of the member 79 is provided with a knurled head 84 whereby the same may be rotated, the rotation thereof effecting a longitudinal movement thereof by reason of the engagement of the stud 82 in spiral groove 81, and the said longitudinal movement causing the conical portion 80 to slide over the arm 77 to cause the same to adjust the friction pads 74 with respect to the disk 71. Rotation of the head 84 in one direction will, of course, cause the pads to be brought closer to or more firmly in engagement with the disk 71, and rotation of the said head in the opposite direction will cause the pads 74 to move in the opposite direction with respect to the disk 71.

Figure 17:
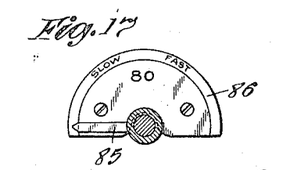

In order to afford a ready ascertainment of the correct or desired angular position of the member 79, I provide a pointer or indicator 85 on the member 79 and a plate or scale 86, with which the pointer or indicator coacts, on the cabinet of the talking machine in proximity to the said pointer or indicator. Suitable inscriptions may be made upon the plate 86, the position of the pointer for normal operation of the machine being indicated in Fig. 17 by the numeral 80 and the direction in which the pointer or indicator 85 should be turned for any desired adjustment being indicated in the said figure by the words "Slow" and "Fast" to the left and right respectively of the numeral 80.

One of the features of my invention is the provision of means whereby the motor, and therefore the record support, is stopped when the reproducer is disengaged from the record surface, and the feeding means are rendered inoperative. The means preferably employed by me for this purpose comprises a lever 87 (see Figs. 14 and 15) pivoted on the spindle 51, one arm of which lever bears upon the under surface of the section 29 of the rack 24. The opposite arm of the lever is downwardly directed and carries at its lower end a friction shoe 89 adapted to be brought into engagement with the disk 71 to stop the motor when the rod 13 is elevated. A spring 89', coiled about the spindle 51 and engaging the lower surface of the lever 87 tends to hold the said lever in engagement with the rack 24 and to roate the lever about its pivot to bring the shoe 89 into engagement with disk 71 to stop the motor when the sound conveyer and rack are elevated.

My invention also comprises an improved cabinet for talking machines. The cabinet in its preferred form is made of sheet metal and comprises sheet metal top and bottom members 90 and 91 respectively, these members being respectively provided with grooves 92 and 93 in which the upper and lower edges of the side member or members 94 are respectively engaged. Bolts or equivalent fastening means 95 pass through the top and bottom members 90 and 91 and are provided at their ends with headed members, such as the nuts 96 and 97, shown in Fig. 2 of the drawing, to hold the top and bottom members firmly in engagement with the side members.

It is well known in the art that the cabinet of a talking machine acts as a sounding box and that if the same is set into vibration by the motor, very unpleasant and foreign sounds are produced. These sounds would be present more particularly in a cabinet made of sheet metal unless some means were provided for eliminating the same. In order to avoid this objection I provide a bottom member 98 of wood or other suitable non-metallic material fitting closely against the sides of the cabinet, as shown, which member I secure to the bottom of the cabinet, as by screws 99. The member 98 serves as a support for the motor frame and has been found to very effectively insulate the talking machine cabinet from the vibrations of the motor.

Figure 2:
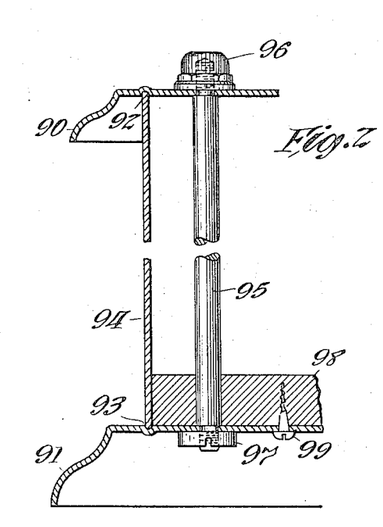
Fig. 2 represents a vertical sectional view illustrating a detail of construction of my improved cabinet.
Figure 2A:
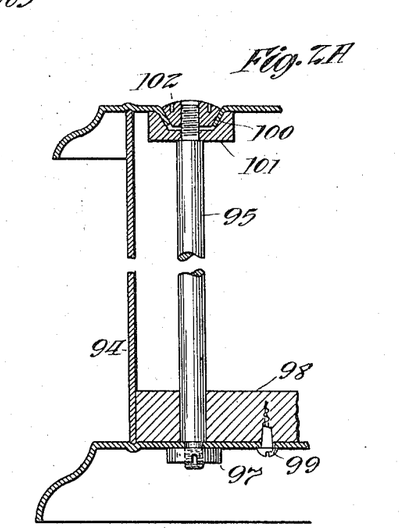

In the modified form of my invention disclosed in Fig. 2ᴬ, the metal of the cabinet is forced down into a tapered recess 100 formed in a nut 101 upon the upper end of the rod 95 by means of a threaded member 102 engaging the upper surface of the metal and having a taper corresponding with the taper of the recess 100. A much more rigid device is obtained by this construction than with the structure shown in Fig. 2, in which the top and bottom of the cabinet merely rest on square shoulders on the rod 95 and are clamped between the said shoulders and the flat faces of the nuts 96 and 97.

Figure 1:
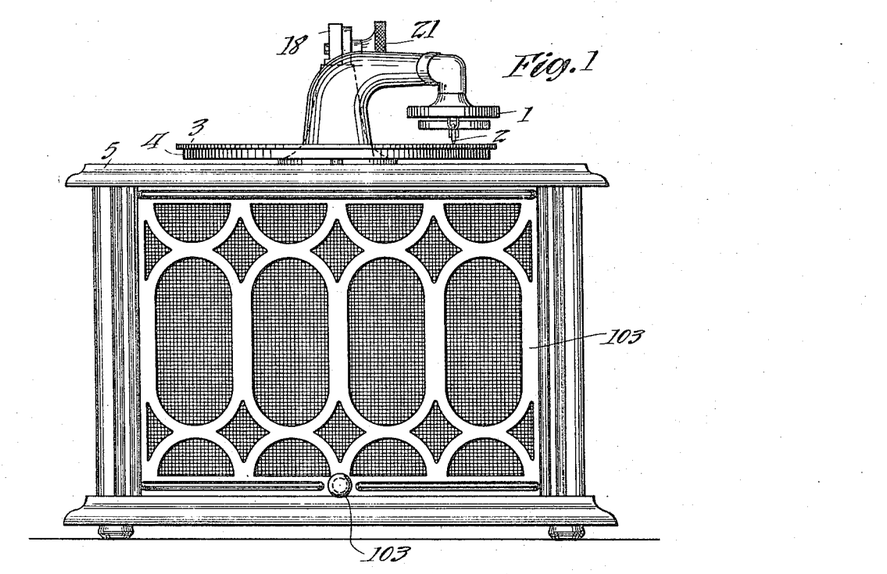
Figure 1 represents a front elevation of a phonograph or talking machine embodying one form of my invention.

As it is frequently desirable to obtain access to the interior of the cabinet, I provide a detachable door 103 for the front of the same (see Figs. 1, 3, and 4). This door, as particularly shown in Fig. 1, is in the form of an ornamental grille and is preferably made of sheet metal. The edges of the door are formed by turning the sheet metal back on itself, as shown at 104, and then outwardly at a right angle to the body of the door as shown at 105. The forward portion of the cabinet in which the opening for the door is provided is formed with flanges 106, against which the flanges 105 of the door are adapted to bear, the upper and lower edges of the door being free from bends, as clearly shown in Fig. 3 and fitting in the grooves 92 and 93 respectively. As the top and bottom of the cabinet are made of resilient material, the upper and lower edges of the door may obviously be disengaged from the recesses 92 and 93 by a slight forward pull on the door. The same resilient characteristic of the top and bottom of the cabinet will also permit the door to be readily put back into closed position.

For covering the openings in the door 103 and at the same time causing the sound waves to diffuse as they leave the sound amplifier and to emanate uniformly throughout substantially the whole extent of the door, I provide a covering 107 of suitable thin fabric, such as pongee silk, the edges of this covering being preferably clamped in place between the superposed portions, shown at 104, of the metal of the door.

Numerous changes may obviously be made in the specific structure herein disclosed without departing from the spirit of my invention, and I wish, therefore, not to be limited to the exact details herein disclosed.

Having now described my invention, what I claim as new therein and desire to protect by Letters Patent is as follows:—

1. In a phonograph or talking machine, the combination of a rotatable record support, driving means for said support comprising a speed governor, a reproducer, a sound conveyer carrying the reproducer and movable to engage the reproducer with or disengage the same from a record carried by said support, and means coacting with said governor to cause said driving means to be automatically stopped by the movement of the conveyer to disengage the reproducer from the record, substantially as described.

2. In a phonograph or talking machine, the combination of a rotatable record support, driving means for said support comprising a speed governor, a reproducer movable into or out of engagement with a record carried by said support, and means coacting with said governor to cause said driving means to be automatically stopped by the movement of the reproducer out of engagement with the record, substantially as described.

3. In a phonograph or talking machine, the combination of a rotatable record support, driving means for said support comprising a speed governor, a reproducer, a sound conveyer carrying the reproducer and movable to engage the reproducer with or disengage the same from a record carried by said support, means for producing a relative feeding movement between the reproducer and a record carried by said support, and means coacting with said governor to stop said driving means, said feeding means being rendered inoperative and said stopping means operative by the movement of the conveyer to disengage the reproducer from the record, substantially as described.

4. In a phonograph or talking machine, the combination of a record support, a sound conveyer, a reproducer connected to said sound conveyer, means coacting with said conveyer for resisting the movement of the reproducer across said record support, said means being operative at different positions assumed by the reproducer in its movement across the record, and means having a single controlling device for rendering said resisting means operative and stopping the rotation of said record support, substantially as described.

5. In a phonograph or talking machine, the combination with a record support, of a reproducer, a sound conveyer carrying said reproducer and extending without flexible joint from the space above to the space below the record support, said conveyer being movable in a substantially straight line to permit the reproducer to be moved into and out of engagement with a record carried by said support, and means comprising a manually operable cam for moving said conveyer to disengage said reproducer from the record, substantially as described.

6. In a phonograph or talking machine, the combination of a record support, a movable sound conveyer, a reproducer connected with said sound conveyer, and means comprising a rotatable driving member and a rack normally coacting with said driving member for moving said conveyer and producing a relative feeding movement between said reproducer and record support, said rack being movable to different angular positions with respect to the surface of said rotatable driving member without moving out of engagement with said driving member and having a convex portion contacting said rotatable member, said convex portion being curved transversely of said member, substantially as described.

7. In a phonograph or talking machine, the combiantion with a sound conveyer, of feeding means therefor comprising a rotatable driving member, a rack coacting therewith and arranged at an angle to the vertical, means for engaging said rack with and disengaging the same from said driving member, said rack comprising a plurality of sections, one secured to said second named means and one adapted for operative engagement with said driving member, said sections being connected for relative movement permitting said second named section to remain in engagement with said driving member during a limited movement of said first named section away from said driving member, and yielding means tending to hold said second named section in engagement with said driving member, substantially as described.

8. In a phonograph or talking machine, the combination with a sound conveyer, of feeding means therefor comprising a rotatable driving member, a rack coacting therewith, and means for engaging said rack with and disengaging the same from said driving member, said rack comprising a plurality of sections, one secured to said second named means and one provided with a feeding portion curved transversely of said member and adapted for engagement therewith, said sections being connected for relative pivotal movement permitting said second named section to remain in engagement with said driving member during a limited movement of said first named section away from said driving member, substantially as described.

9. In a phonograph or talking machine, the combination with a movable sound conveyer, of a friction member adapted to engage the mouth of said conveyer to resist lateral movement of the latter, at different positions assumed by the same in its lateral movement, substantially as described.

10. The combination of a rotatable record support, a reproducer in operative relation thereto, a sound conveyer connected to said reproducer, a longitudinally movable pivot member for said sound conveyer, and means controlled by the longitudinal movement of said pivot member to stop the rotation of said record support, substantially as described.

11. The combination of a rotatable record support, a reproducer in operative relation thereto, a sound conveyer carrying said reproducer, a longitudinally movable pivot member secured to said sound conveyer, said reproducer being movable into and out of engagement with a record carried by said support by the longitudinal movement of said pivot member, and means controlled by the longitudinal movement of said pivot member to effect the starting and stopping of the rotation of said record support, substantially as described.

12. The combination of a rotatable record support, a reproducer in operative relation thereto, a sound conveyer connected to said reproducer, a longitudinally movable pivot member for said sound conveyer, means for producing a relative feeding movement between said reproducer and said record support, and means controlled by the longitudinal movement of said pivot member to stop the rotation of said record support and to simultaneously render said feed producing means inoperative, substantially as described.

13. An improved rack comprising a plurality of sections connected for pivotal movement about a given axis, one section being adapted to be secured to a support for pivotal movement about an axis at an angle to said first named axis, the other section being provided adjacent the end thereof with feeding means, said feeding means being curved transversely of the length thereof into a convex shape and extending in a curve having its center located in said second named axis, substantially as described.

14. An improved rack provided with means whereby the same may be supported for pivotal movement about a given axis, said rack being also provided with feeding means, said feeding means being curved transversely of the length thereof into a convex shape and arranged in the form of a curve having its center located in said axis, substantially as described.

15. An improved rack provided with means whereby the same may be supported for pivotal movement about a given axis, said rack being also provided with a worm shaped feeding portion having its axis arranged in the form of a curve having its center located in said first named axis, substantially as described.

16. The combination of a sound amplifier, a mounting for said amplifier permitting lateral movement thereof, and a friction member, said amplifier and friction member being arranged to permit the mouth of the amplifier to slide laterally over the friction member, substantially as described.

17. The combination of a record support, a conveyer movable relatively thereto, means for producing a relative feeding movement between said conveyer and said record support, means coacting with the mouth of said conveyer for resisting movement of said conveyer relatively to said record support at different positions of the said conveyer, and means for simultaneously rendering said feeding means inoperative and said resisting means operative, substantially as described.

18. The combination of a record support, a conveyer movable relatively thereto, means for producing a relative feeding movement between said conveyer and said record support, means frictionally coacting with the mouth of said conveyer for resisting movement of said conveyer relatively to said record support at different positions of the said conveyer, and means for simultaneously rendering said feeding means inoperative and said resisting means operative, substantially as described.

19. In a phonograph or talking machine, the combination of a record support, a sound conveyer, a reproducer connected to said sound conveyer, means coacting with the mouth of said conveyer for resisting the movement of said reproducer across said record support, said means being operative at different positions assumed by the reproducer in its travel across the record support, and means for simultaneously rendering said resisting means operative and causing said reproducer to be lifted away from said record support, or for simultaneously rendering said resisting means inoperative and causing said reproducer to move toward said support, substantially as described.

20. In a phonograph or talking machine, the combination of a record support, a sound conveyer, a reproducer connected to said sound conveyer, means frictionally coacting with the mouth of said conveyer for resisting the movement of said reproducer across said record support, said means being operative at different positions assumed by the reproducer in its travel across the record support, and means for simultaneously rendering said resisting means operative and causing said reproducer to be lifted away from said record support, or for simultaneously rendering said resisting means inoperative and causing said reproducer to move toward said support, substantially as described.

21. In a phonograph or talking machine, the combination of a record support, a reproducer, a sound conveyer carrying said reproducer and extending without flexible joint rearwardly, then downwardly and then forwardly under said record support, said reproducer having a stylus mounted with sufficient freedom of movement with respect to the sound conveyer to permit the same to accommodate itself to surface irregularities in a record carried by said support, and means mounting said conveyer for pivotal movement about an axis a substantial distance to the rear of said reproducer to permit the reproducer to travel across the record, said means comprising means for moving the conveyer to cause the reproducer to be engaged with or disengaged from the record and means for guiding said sound conveyer in a substantially straight line during such movement, substantially as described.

22. In a phonograph or talking machine, the combination of a record support, a reproducer above said support, a sound conveyer carrying said reproducer and extending without flexible joint rearwardly, then downwardly and then forwardly under said record support, said conveyer being mounted for pivotal movement about an axis a substantial distance to the rear of the reproducer to permit said reproducer to travel across a record carried by said support and being capable of movement to permit said reproducer to be engaged with or disengaged from the record, feeding means for effecting the pivotal movement of the conveyer, and unitary means for shifting said conveyer to cause the reproducer to be disengaged from the record and for rendering said feeding means inoperative, substantially as described.

23. In a phonograph or talking machine, the combination of a record support, a reproducer, a sound conveyer carrying said reproducer and extending rearwardly, then downwardly and then forwardly under said record support, said reproducer having a stylus mounted with sufficient freedom of movement with respect to the sound conveyer to permit the same to accommodate itself to surface irregularities in a record carried by said support, and means mounting said conveyer for pivotal movement about an axis a substantial distance to the rear of said reproducer to permit the reproducer to travel across the record, said means comprising means for moving the conveyer to cause the reproducer to be engaged with or disengaged from the record and means for guiding said sound conveyer in a substantially straight line during such movement, substantially as described.

24. In a phonograph or talking machine, the combination of a record support, a reproducer above said support, a sound conveyer carrying said reproducer and extending without flexible joint rearwardly, then downwardly and then forwardly under said record support, said conveyer being mounted for pivotal movement about an axis a substantial distance to the rear of the reproducer to permit said reproducer to travel across a record carried by said support and being capable of rectilinear movement to permit said reproducer to be engaged with or disengaged from the record, feeding means for effecting the pivotal movement of the conveyer, and unitary means for shifting said conveyer to cause the reproducer to be disengaged from the record and for rendering said feeding means inoperative, substantially as described.

25. In a phonograph or talking machine, the combination of a record support, a reproducer, a sound conveyer carrying said reproducer and extending rearwardly, then downwardly and then forwardly under said record support, and means mounting said conveyer for pivotal movement about an axis a substantial distance to the rear of said reproducer to permit the reproducer to travel across the record, said means comprising means for moving the conveyer to cause the reproducer to be engaged with or disengaged from the record and means for guiding said sound conveyer in a substantially straight line during such movement, substantially as described.

26. In a phonograph or talking machine, the combination of a record support, a reproducer above said support, a sound conveyer carrying said reproducer and extending rearwardly, then downwardly and then forwardly under said record support, said conveyer being mounted for pivotal movement about an axis a substantial distance to the rear of the reproducer to permit said reproducer to travel across a record carried by said support and being capable of movement to permit said reproducer to be engaged with or disengaged from the record, feeding means for effecting the pivotal movement of the conveyer, and unitary means for shifting said conveyer to cause the reproducer to be disengaged from the record and for rendering said feeding means inoperative, substantially as described.

27. In a phonograph or talking machine, the combination of a record support, a cabinet carrying the same, a reproducer, and a sound conveyer carrying said reproducer and extending rearwardly, then downwardly past said record support, and then forwardly within said cabinet, and means mounting said conveyer for pivotal movement about an axis a substantial distance to the rear of said reproducer to permit the latter to travel across a record carried by said support, said means comprising means for moving the conveyer to cause the reproducer to be engaged with or disengaged from the record and means for guiding said conveyer in a substantially straight line during such movement, substantially as described.

28. In a phonograph or talking machine, the combination of a record support, a reproducer above said support, a sound conveyer carrying said reproducer and extending rearwardly, then downwardly and then forwardly under said record support, said conveyer being mounted for pivotal movement about an axis a substantial distance to the rear of the reproducer to permit said reproducer to travel across a record carried by said support and being capable of rectilinear movement to permit said reproducer to be engaged with or disengaged from the record, feeding means for effecting the pivotal movement of the conveyer, and unitary means for shifting said conveyer to cause the reproducer to be disengaged from the record and for rendering said feeding means inoperative, substantially as described.

This specification signed and witnessed this 9th day of August 1912.

THOS. A. EDISON.

Witnesses:
FREDERICK BACHMANN,
ANNA R. KLEHM.